(12) United States Patent
Buttolo et al.

(10) Patent No.: US 10,377,295 B2
(45) Date of Patent: Aug. 13, 2019

(54) CARGO RESTRAINING SYSTEM AND METHOD FOR A MOTOR VEHICLE

(71) Applicant: FORD GLOBAL TECHNOLOGIES, LLC, Dearborn, MI (US)

(72) Inventors: Pietro Buttolo, Dearborn Heights, MI (US); Annette Lynn Huebner, White Lake, MI (US); Stuart C. Salter, White Lake, MI (US); Paul Kenneth Dellock, Northville, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 15/611,928

(22) Filed: Jun. 2, 2017

(65) Prior Publication Data

US 2018/0345844 A1 Dec. 6, 2018

(51) Int. Cl.
*B60R 21/06* (2006.01)
*B60P 7/08* (2006.01)
*B60R 7/00* (2006.01)

(52) U.S. Cl.
CPC .............. *B60P 7/0876* (2013.01); *B60P 7/08* (2013.01); *B60R 7/005* (2013.01); *B60R 21/06* (2013.01)

(58) Field of Classification Search
CPC ... B60R 21/06; B60R 7/005; B60R 2021/065; B60R 7/02; B60R 5/04; B60R 5/044; B60R 7/043
USPC .......... 410/118, 100, 117, 97; 224/545, 547, 224/550, 555, 925, 561
See application file for complete search history.

(56) References Cited

U.S. PATENT DOCUMENTS

| | | | |
|---|---|---|---|
| 3,011,820 A * | 12/1961 | Frieder | B66C 1/127 294/77 |
| 5,437,474 A * | 8/1995 | Ament | B60R 21/06 280/749 |
| 5,452,973 A * | 9/1995 | Arvin | B60P 7/0876 410/117 |
| 5,542,591 A | 8/1996 | Moore et al. | |
| 5,772,370 A | 6/1998 | Moore | |
| 5,820,187 A * | 10/1998 | Ament | B60R 21/06 296/24.43 |
| 6,983,970 B2 * | 1/2006 | Bateman | B60R 21/06 296/24.43 |
| 7,059,646 B1 | 6/2006 | DeLong et al. | |

(Continued)

FOREIGN PATENT DOCUMENTS

| | | |
|---|---|---|
| DE | 4010209 A1 | 10/1991 |
| DE | 4239470 A1 | 5/1994 |
| DE | 102016111021 A1 | 12/2016 |

OTHER PUBLICATIONS

English Machine Translation of DE4239470A1.
English Machine Translation of DE102016111021A1.
English Machine Translation of DE4010209A1.

*Primary Examiner* — D Glenn Dayoan
*Assistant Examiner* — Sunsurraye Westbrook
(74) *Attorney, Agent, or Firm* — Vichit Chea; King & Schickli, PLLC

(57) ABSTRACT

A cargo restraining system has a frame and a cargo net carried on the frame. The frame and the cargo net are displaceable between a first position partitioning a cargo area from a passenger area of a motor vehicle and a second position overlying cargo supported on a cargo area floor of the motor vehicle. A related method is also disclosed.

15 Claims, 6 Drawing Sheets

(56) References Cited

U.S. PATENT DOCUMENTS

| | | |
|---|---|---|
| 2007/0194583 A1 | 8/2007 | Coles et al. |
| 2010/0158630 A1 | 6/2010 | Combs, Jr. |
| 2011/0266822 A1 | 11/2011 | Takemura |
| 2015/0298596 A1* | 10/2015 | Blohm ................ B60P 7/0876 410/96 |

* cited by examiner

CARGO RESTRAINING SYSTEM AND METHOD FOR A MOTOR VEHICLE

TECHNICAL FIELD

This document relates generally to the motor vehicle equipment field and, more particularly, to a new and improved cargo restraining system as well as to a related method of restraining cargo in a cargo area of a motor vehicle.

BACKGROUND

Motor vehicles such as sport utility vehicles (SUV), cross over vehicles (COV) and vans typically include an interior compartment wherein the forward end is a passenger area that provides for passenger seating and the rearward end is a cargo area with a flat floor to facilitate the loading and extraction of cargo. Often because of acceleration, deceleration and lateral cornering forces, non-secured items in the cargo area shift during motor vehicle operation and may even become wedged against the liftgate or doors at the rear of the motor vehicle provided to access the cargo area. When this occurs, those cargo items may fall from the motor vehicle when the liftgate or doors are opened. At other times, cargo in the cargo area may suddenly shift forward when the vehicle is rapidly decelerated possibly even making an incursion into the passenger area of the motor vehicle.

This document relates to a new and improved cargo restraining system and related method of restraining cargo in a cargo area of the motor vehicle that prevent the undesired shifting of cargo during motor vehicle operation. Advantageously, the cargo restraining system is simple and inexpensive to produce and the cargo restraining system and method are very easy to use. As such, the cargo restraining system and related method represent a significant advance in the art.

SUMMARY

In accordance with the purposes and benefits described herein, a cargo restraining system is provided. That cargo restraining system comprises a frame and a cargo net carried on the frame. The frame and the cargo net are displaceable between a first position, partitioning a cargo area from a passenger area of the interior compartment of the motor vehicle, and a second position overlying the cargo supported on the cargo area floor of the motor vehicle.

The cargo net may span the frame. Further, the cargo net may be an elastic cargo net that is stretched across the frame.

The frame may include a pivot shaft whereby at least a portion of the frame and the cargo net are pivoted between the first position and the second position. The frame may further include a first side rib, a second side rib and a cross rib. The cross rib may be provided opposite the pivot shaft and may connect the first side rib and the second side rib.

The cargo restraining system may further include a first biasing element connected to the first pivot shaft and the first side rib. This first biasing element functions to bias the cargo net toward the first position.

The cargo restraining system may further include a latching element. That latching element may be carried on the cross rib and used to secure the frame and the cargo net in the second position.

The pivot shaft may be telescoping. In addition, the first side rib, the second side rib and the cross rib may all be extendable. Toward this end the first side rib may include a first section, a second section and a connector sleeve.

The telescoping pivot shaft may include a second biasing element biasing the telescoping pivot shaft toward an expanded configuration.

The cargo restraining system may further include a first securing element at a first end of the telescoping pivot shaft and a second securing element at a second end of the telescoping pivot shaft. The first securing element may be a first pad having a first hook and loop fastening device. The second securing element may be a second pad having a second hook and loop fastening device. The latching element may be a hook and look fastener flap.

In accordance with an additional concept, a method is provided for restraining cargo in a cargo area of a motor vehicle. That method comprises positioning a cargo restraining system in one of a first position partitioning a cargo area from a passenger area of the motor vehicle and a second position overlying cargo supported on a cargo area floor of the motor vehicle wherein the cargo restraining system includes a cargo net spanning a frame.

The method may further include the step of biasing, by a first biasing element, the cargo restraining system toward the first position. In addition, the method may include securing, by a latching element, the cargo restraining system in the second position.

The method may further include the step of pivoting the cargo restraining element about a pivot shaft of the frame when displacing the cargo restraining element between the first position and the second position. Still further, the method may include the steps of securing, by a first securing element, a first end of the pivot shaft to the motor vehicle, and securing, by a second securing element, a second end of the pivot shaft to the motor vehicle.

In addition, the method may include the steps of (a) loading cargo into the cargo area floor while the cargo restraining system is in the first position, (b) pivoting the cargo restraining system into the second position whereby the cargo net overlies the cargo and (c) securing, by a latching element, the cargo restraining system in the second position.

In the following description, there are shown and described several preferred embodiments of the cargo restraining system and the related method of restraining cargo in a cargo area of a motor vehicle. As it should be realized, the cargo restraining system and related method are capable of other, different embodiments and their several details are capable of modification in various, obvious aspects all without departing from the cargo system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cargo restraining system and related method and together with the description serve to explain certain principles thereof.

Figure 1:
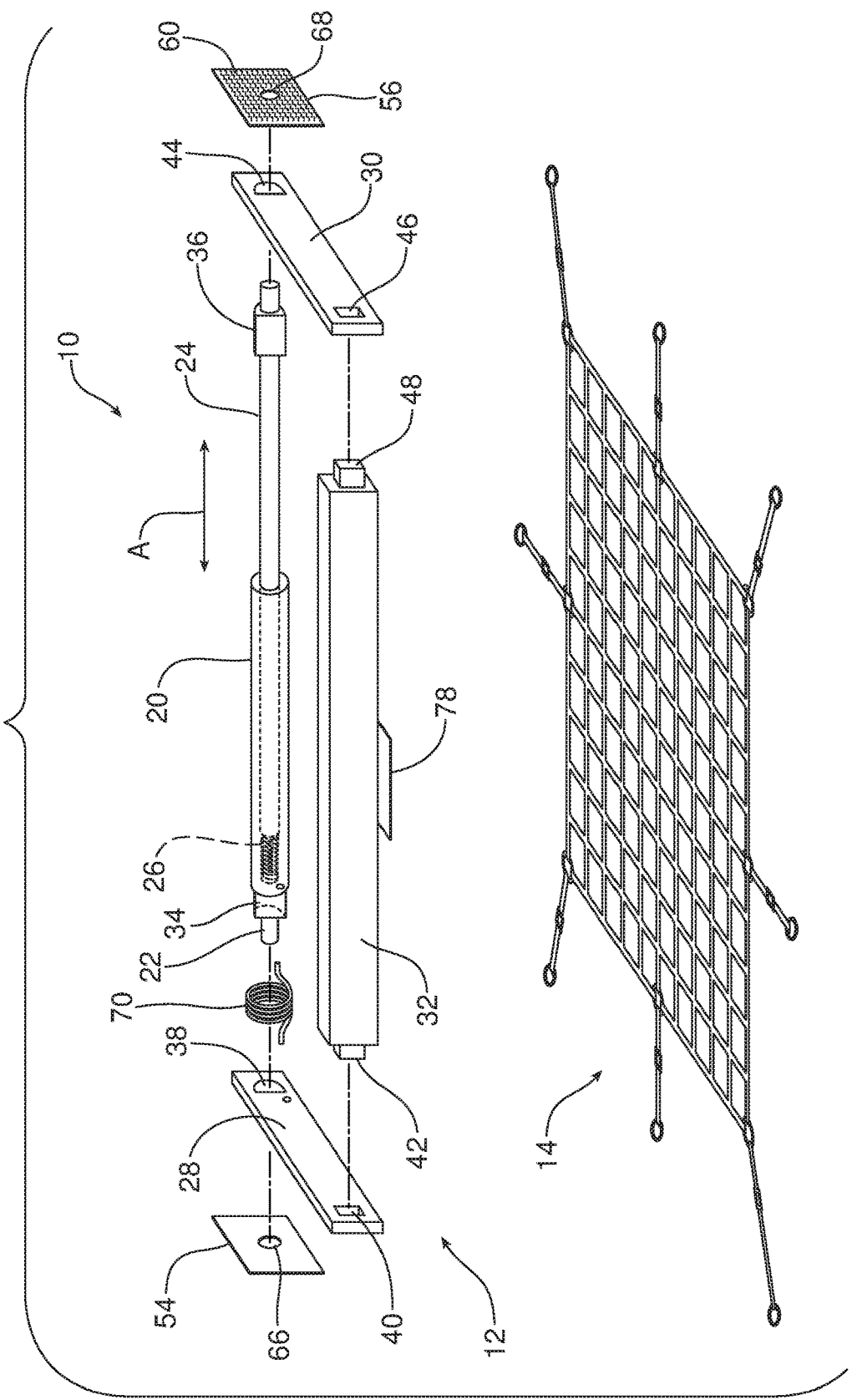
FIG. 1 is an exploded perspective view of one possible embodiment of the cargo restraining system.
Figure 2:
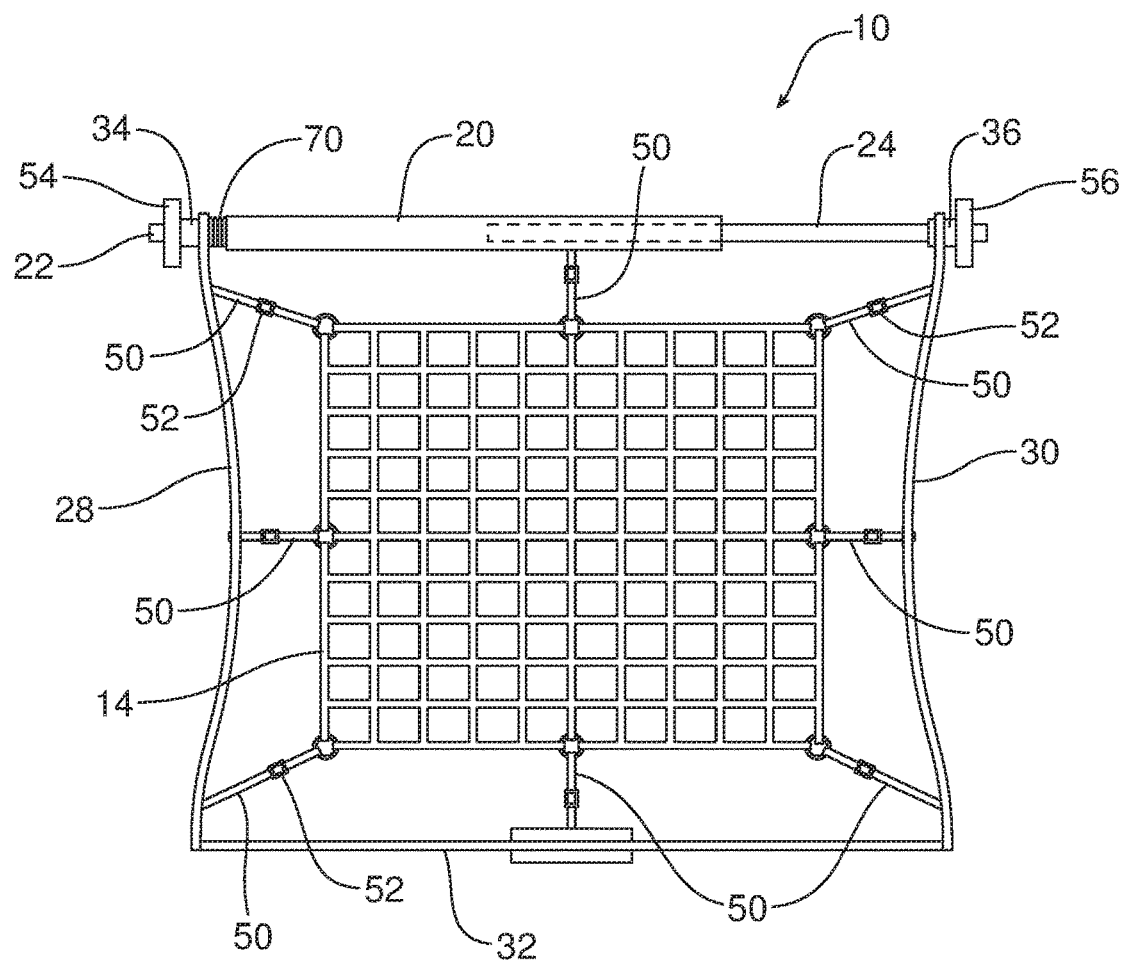
FIG. 2 is a top plan view illustrating the cargo restraining system of FIG. 1 in a fully assembled condition.

Reference will now be made in detail to the present preferred embodiments of the cargo restraining system and related method of restraining cargo in a cargo area of a motor vehicle, examples of which are illustrated in the accompanying drawing figures.

DETAILED DESCRIPTION

Reference is now made to FIGS. 1-4 illustrating one possible embodiment of the new and improved cargo restraining system 10. That cargo restraining system 10 includes a frame, generally designated by reference numeral 12 and a cargo net 14 carried on the frame. As will be apparent from the following description, the frame 12 and cargo net 14 are displaceable between a first position illustrated in FIG. 3 wherein the cargo restraining system 10 partitions a cargo area 16 of the motor vehicle V aft of the cargo restraining system from a passenger area 18 forward of the cargo restraining system 10.

The frame 12 includes a pivot shaft 20. In the illustrated embodiment, the pivot shaft 20 is telescoping and includes a first section 22, a second section 24 and a biasing element 26 in the form of a compression spring which biases the telescoping pivot shaft 20 toward an expanded configuration, note double action arrow A.

The frame 12 also includes a first side rib 28, a second side rib 30 and a cross rib 32. The first side rib 28, the second side rib 30 and the cross rib 32 may all be made from a semi rigid material such as pine and fir wood, carbon fiber, or composite material.

The frame 12 also includes a first hinge or pivot sleeve 34 that is received for relative rotation on the first section 22 of the pivot shaft 20 and a second hinge or pivot sleeve 36 that is received for relative rotation on the second section 24 of the pivot shaft.

The first side rib 28 includes a keyed aperture 38 at a first end that matches the outer surface of the first pivot sleeve 34 thereby keying the first side rib to the first pivot sleeve. The first side rib 28 includes a first receiver 40 at a second end adapted to receive and hold the first end lug 42 on the cross rib 32.

Similarly, the second side rib 30 includes a second keyed aperture 44 at one end matching the outer surface of the second pivot sleeve 36 thereby keying the second side rib to the second pivot sleeve. A second receiver 46 is provided at the other end of the second side rib 30 for receiving and holding the second end lug 48 at the second end of the cross rib 32.

The cargo net 14 may comprise an elastic cargo net that is stretched across to span the frame 12. More specifically, the cargo net 14 may include a series of fastening straps 50 with cooperating hook and loop fasteners 52 to secure the cargo net to the pivot shaft 20, first side rib 28, second side rib 30 and cross rib 32 as illustrated in the drawing figures. Of course, it should be appreciated that alternative fastening devices may be utilized for the cargo net including, for example, hooks or other appropriate fastening hardware. When the cargo net 14 is properly secured to and spans the frame 12, the semi rigid first side rib 28, second side rib 30 and cross rib 32 may flex inward toward the cargo net in the manner illustrated in FIG. 2. As should be appreciated, the elastic force provided by the stretched cargo net 14 tends to hold the frame components including the pivot shaft 20, first side rib 28, second side rib 30 and cross rib 32 together in the assembled configuration.

The cargo restraining system 10 also includes a first securing element 54 and a second securing element 56 to secure the pivot shaft 20 in position in the motor vehicle V. In the illustrated embodiment, the first securing element 54 comprises a first pad including a first hook and loop fastening device 58 and the second securing element 56 comprises a second pad having a second hook and loop fastening device 60. As illustrated in the drawing figures, the first securing element 54 is received over and secures a first end 62 of the pivot shaft 20 to the motor vehicle while the second securing element 56 is received over and secures a second end 64 of the pivot shaft to the motor vehicle. Toward this end, the first securing element 54 may include a first shaft receiving aperture 66 while the second securing element 56 may include a second shaft receiving aperture 68.

The cargo restraining system 10 also includes a biasing element 70 having a first end 72 connected to the pivot shaft 20 at the aperture 77 and a second end 74 connected to the first side rib 28 by passing through the aperture 76. As will be explained in greater detail below, this biasing element 70 functions to bias a portion of the frame 12 including the first side rib 28, second side rib 30 and cross rib 32 as well as the cargo net 14 toward the first, substantially vertical position illustrated in FIG. 3.

The cargo restraining system 10 also includes a latching element 78 carried on the cross rib 32 opposite the pivot shaft 20. The latching element 78 in the illustrated embodiment is a hook and loop fastener flap. As will be explained below the latching element 78 is used to secure the frame 12 and the cargo net 14 in the second position illustrated in FIG. 4.

Figure 3:
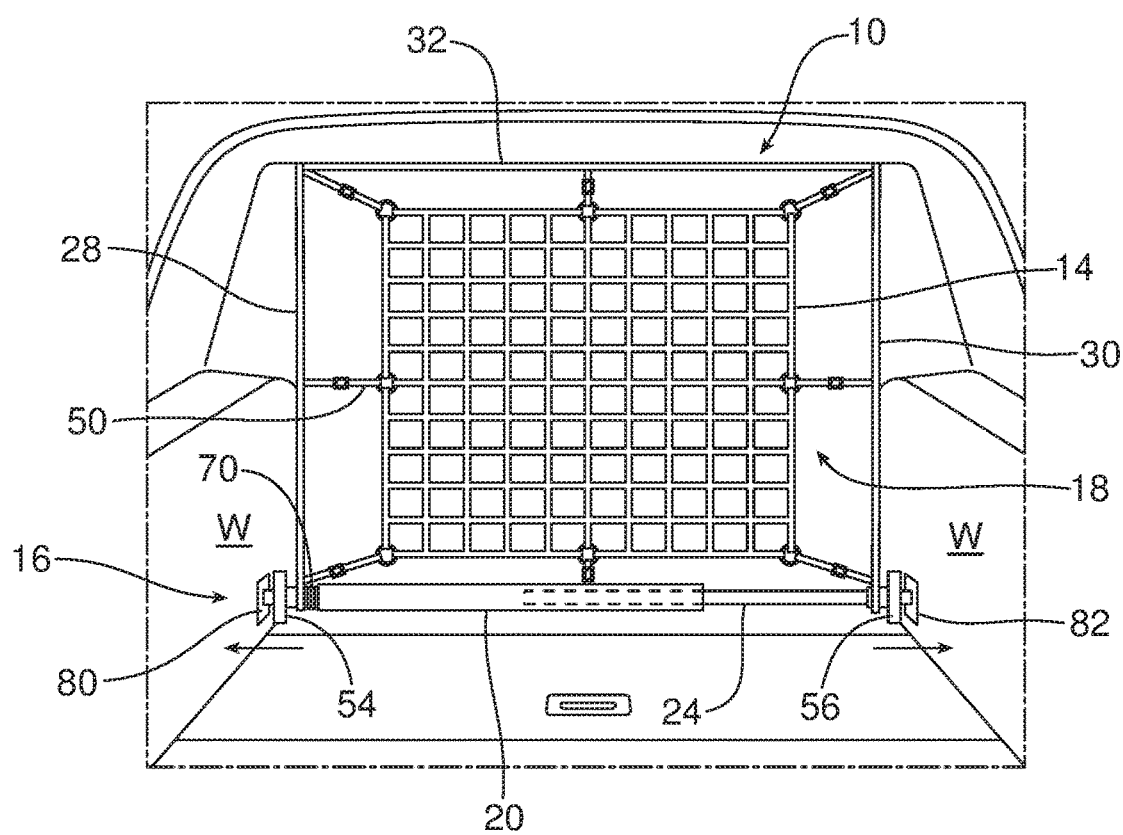
FIG. 3 is a rear plan view of the interior compartment of a motor vehicle equipped with the cargo restraining system of FIGS. 1 and 2 with that system illustrated in a first position partitioning a cargo area from a passenger area of the motor vehicle.
Figure 4:
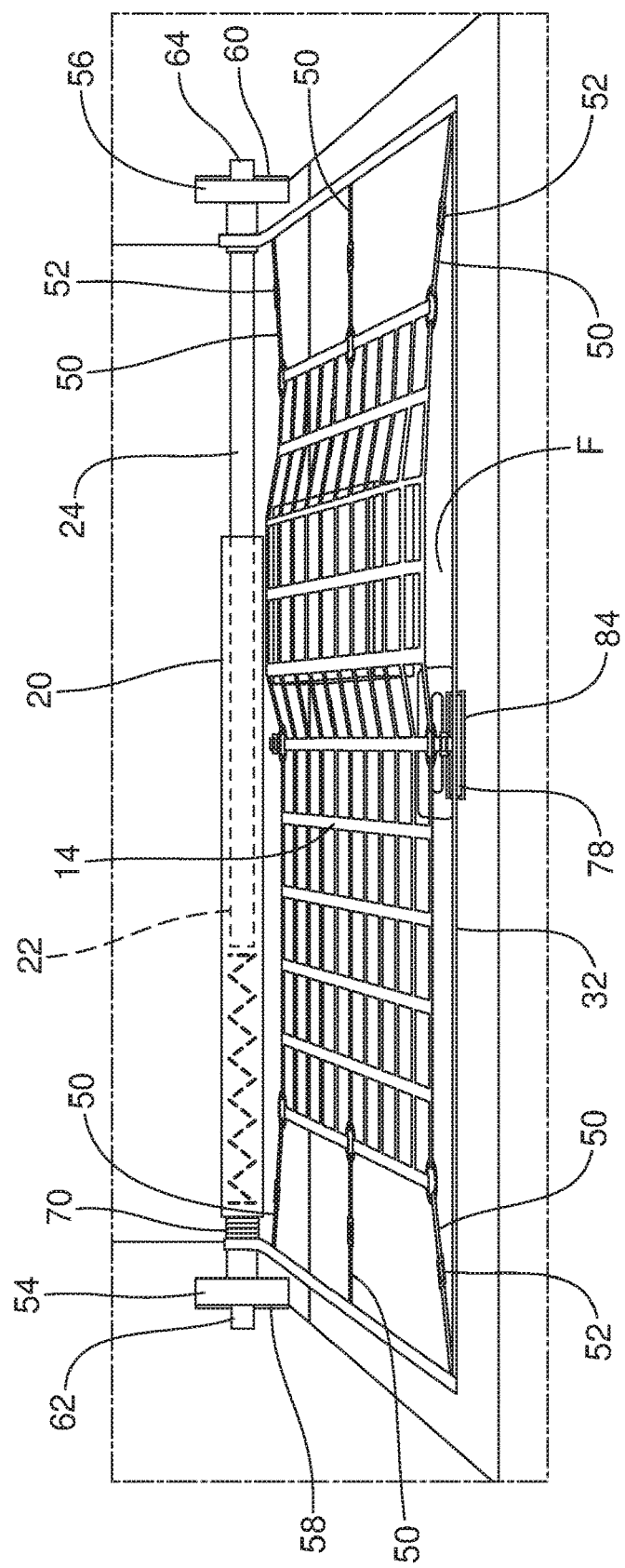
FIG. 4 is a view similar to FIG. 3 but illustrating the cargo restraining system in the second position overlying cargo supported on a cargo area floor of the motor vehicle.
Figure 5:
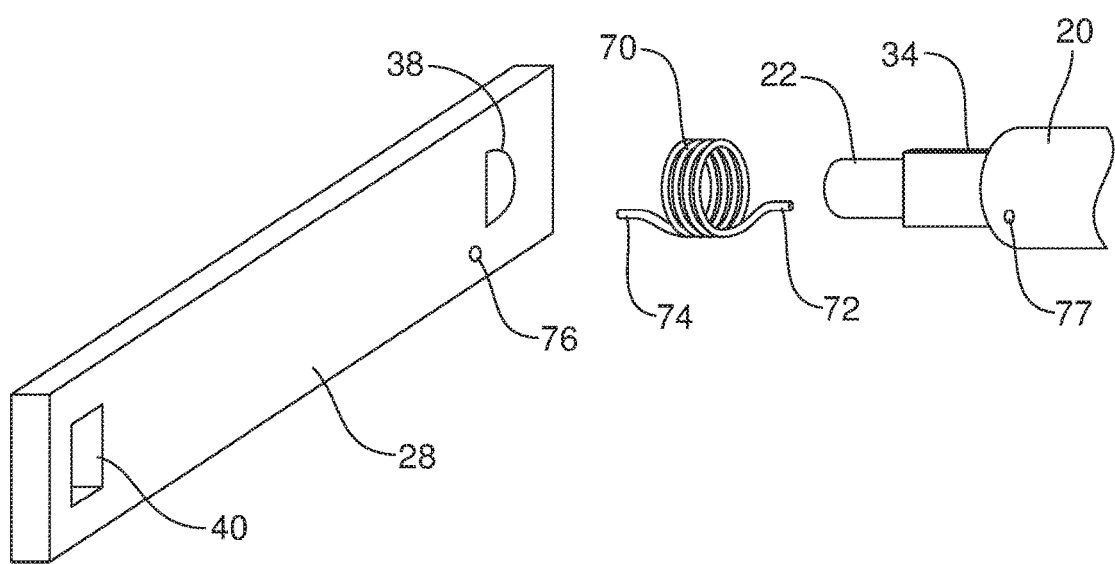
FIG. 5 is a detailed perspective view illustrating the biasing element that biases the cargo restraining system toward the first position illustrated in FIG. 1.

Reference is now made to FIGS. 3 and 4. The cargo restraining system 10 is mounted in the cargo area 16 of the motor vehicle V at a desired location. More specifically, one compresses the telescoping pivot shaft 20 by pushing the first end 62 and the second end 64 together. Once the cargo restraining system 10 is in the desired position in the cargo area 16 with the frame 12 oriented in a vertical orientation as illustrated in FIG. 3, one releases the pressure on the pivot shaft 20. The biasing element 26 then biases the first end 62 and second end 64 of the pivot shaft 20 in the direction of double action arrow A in FIG. 1 until the ends of the shaft engage the opposed sidewalls W of the cargo area 16 adjacent the cargo area floor F. Cooperating receivers or sockets (not shown) may be provided in those sidewalls. The first securing element 54 and second securing element 56 are then pushed outward at the ends of the pivot shaft 20 to engage the first and second hook and loop fastening devices 58, 60 with cooperating hook and loop fastening devices 80, 82 secured to the sidewalls W and thereby hold the pivot shaft 20 in position. As should be appreciated, the telescoping pivot shaft 20 ensures a proper connection.

The biasing element 26 functions to bias the first side rib 28, second side rib 30, cross rib 32 and cargo net 14 toward the first, vertically-oriented position illustrated in FIG. 3. In this position, the cargo restraining system 10 effectively partitions the passenger area 18 of the motor vehicle from the cargo area 16 thereby ensuring that cargo does not intrude into the passenger area during motor vehicle operation.

As illustrated in FIG. 4, at other times one may desire to carry cargo C on the cargo area floor F. One can use the cargo restraining system 10 to maintain the cargo C at a desired position on the cargo floor F during motor vehicle operation by engaging the frame 12 or a string, rope or other device (not shown) connected to the frame and displace the frame 12 and the cargo net 14 carried thereon to the second position illustrated in FIG. 4 wherein the cargo net overlies the cargo C supported on the cargo area floor F of the motor vehicle V. More specifically, when this is done the first side rib 28 and the second side rib 30 of the frame 12 pivot about the pivot shaft 20 on the respective first pivot sleeve 34 and second pivot sleeve 36 against the biasing force of the biasing element 70.

When fully pivoted on the pivot shaft 20 and lowered over the cargo C, the elastic cargo net 14 is stretched over the cargo C to hold the cargo in position on the cargo area floor F. The flexibility of the semi rigid first side rib 28, second side rib 30 and cross rib 32 further aid in providing the elastic force necessary to hold the cargo in place. Once the cargo restraining system 10 is in the second position with the first side rib 28, second side rib 30 and cross rib 32 adjacent the cargo area floor F, the latching element 78 is secured to a cooperating hook and loop fastener device 84 fixed to the cargo floor. Accordingly, it should be appreciated that the latching device 78 functions to secure the frame 12 and cargo net 14 in the second position against the biasing force of the biasing element 70 so that the cargo C may be held in position on the cargo area floor F.

Consistent with the above description, a method is provided for restraining cargo C in a cargo area 16 of a motor vehicle V. That method may be broadly described as comprising the step of positioning the displaceable cargo restraining system 10 in one of a first position, partitioning a cargo area 16 from a passenger area 18 of the motor vehicle (see FIG. 3), and a second position overlying cargo C supported on a cargo area floor F of the motor vehicle (as illustrated in FIG. 4) wherein the cargo restraining system 10 includes a cargo net 14 spanning a frame 12.

The method may further include the step of biasing, by a first biasing element 70, the cargo restraining system 10 toward the first position. Still further, the method may include the step of securing, by a latching element 78, the cargo restraining system 10 in the second position.

Still further, the method may include the step of pivoting the cargo restraining system 10 and, more particularly, the first side rib 28, second side rib 30 and cross rib 32 of the frame 12 about the pivot shaft 20 of the frame 12 when displacing the cargo restraining system 10 between the first position and the second position. Still further, the method may include the step of securing, by the first securing element 54, a first end 62 of the pivot shaft 20 to the motor vehicle. The method may also include the step of securing, by the second securing element 56, the second end 64 of the pivot shaft 20 to the motor vehicle V. Further, the method may include biasing, by the second biasing element 26 the pivot shaft into or toward an expanded configuration for mounting against the sidewalls W of the cargo area 16 of the motor vehicle.

Still further, the method may include the steps of (a) loading cargo C onto the cargo area floor F while the cargo restraining system 10 is in the first position, (b) pivoting the cargo restraining system 10 into the second position whereby the cargo net 14 overlies the cargo C and (c) securing, by the latching element 78 the cargo restraining system 10 in the second position.

Figure 6:
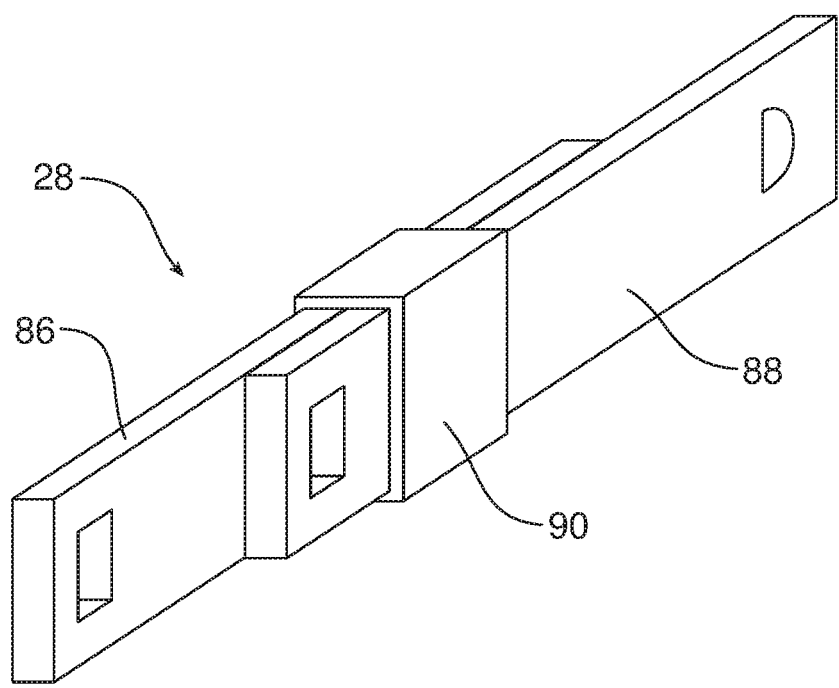
FIG. 6 is a detailed perspective view of the first side rib of an alternative embodiment of the cargo restraining system.

The foregoing has been presented for purposes of illustration and description. It is not intended to be exhaustive or to limit the embodiments to the precise form disclosed. Obvious modifications and variations are possible in light of the above teachings. For example, the first side rib 28, the second side rib 30 and the cross rib 32 may be extendable or adjustable in length. Toward this end, reference is made to FIG. 6 illustrating a first side rib 28 including a first section or segment 86, a second section or segment 88 and a connector sleeve 90. One may slide the first segment 86 and second segment 88 with respect to each other within the connector sleeve 90 to lengthen or shorten the first side rib 28 to meet the needs of any desired cargo restraining system application. The second side rib 30 and the cross rib 32 may have a similar construction to allow for lengthening or shortening as well. All such modifications and variations are within the scope of the appended claims when interpreted in accordance with the breadth to which they are fairly, legally and equitably entitled.

What is claimed:

1. A cargo restraining system, comprising:
    a frame including a pivot shaft, a first side rib, a second side rib and a cross rib connecting said first side rib and said second side rib;
    an elastic cargo net spanning said frame; and
    said frame and said cargo net being pivoted about said pivot shaft between a first position and a second position.

2. The cargo restraining system of claim 1, further including a first biasing element connected to said pivot shaft and said first side rib biasing said cargo net toward said first position.

3. The cargo restraining system of claim 2, further including a latching element carried on said cross rib and used to secure said frame and cargo net in said second position.

4. The cargo restraining system of claim 3, wherein said pivot shaft is telescoping.

5. The cargo restraining system of claim 4, wherein said first side rib, said second side rib and said cross rib are extendable.

6. The cargo restraining system of claim 5, wherein said first side rib includes a first section, a second section and a connector sleeve.

7. The cargo restraining system of claim 6, wherein said pivot shaft includes a second biasing element biasing said pivot shaft toward an expanded configuration.

8. The cargo restraining system of claim 7, further including a first securing element at a first end of said pivot shaft and a second securing element at a second end of said pivot shaft.

9. The cargo restraining system of claim 8, wherein said first securing element is a first pad having a first hook and loop fastening device and said second securing element is a second pad having a second hook and loop fastening device.

10. The cargo restraining system of claim 3, wherein said latching element is a hook and loop fastener flap.

11. A method of restraining cargo in a cargo area of a motor vehicle, comprising:
    positioning a displaceable cargo restraining system in one of a first position partitioning said cargo area from a passenger area of said motor vehicle and a second position overlying cargo supported on a cargo area floor of said motor vehicle wherein said cargo restraining system includes a cargo net spanning a frame; and biasing, by a first biasing element, said cargo restraining system toward said first position.

12. The method of claim 11, further including securing, by a latching element, said cargo restraining system in said second position.

13. The method of claim 11, further including pivoting said cargo restraining system about a pivot shaft of said frame when displacing said cargo restraining system between said first position and said second position.

14. The method of claim 13, further including securing, by a first securing element, a first end of said pivot shaft to said motor vehicle and securing, by a second securing element, a second end of said pivot shaft to said motor vehicle.

15. The method of claim 11, further including (a) loading cargo onto said cargo area floor while said cargo restraining system is in said first position, (b) pivoting said cargo restraining system into said second position whereby said cargo net overlies said cargo and (c) securing, by a latching element, said cargo restraining system in said second position.

* * * * *